Aug. 22, 1961      H. V. HANSEN      2,996,926
DRIVE MECHANISM FOR PLANTERS

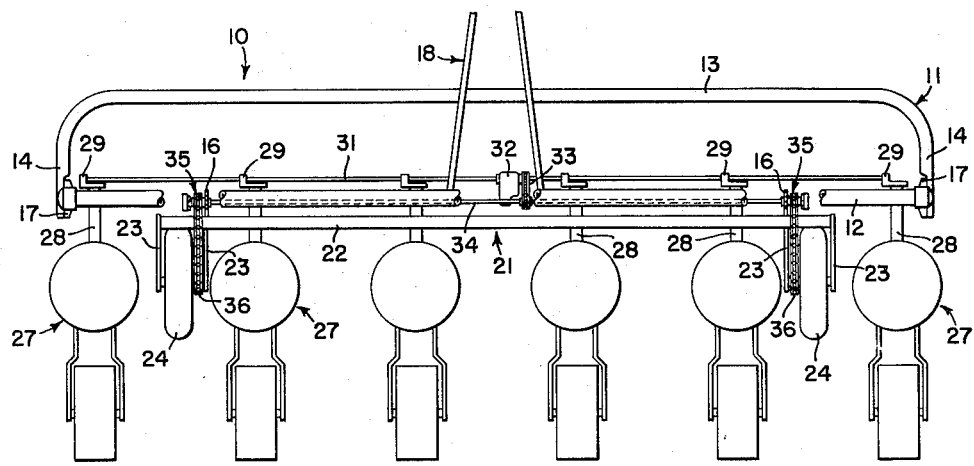

Filed July 24, 1959      2 Sheets-Sheet 2

INVENTOR.
HAROLD V. HANSEN
BY
Roger C. Johnson
ATTORNEYS 2,996,926
Patented Aug. 22, 1961

2,996,926
DRIVE MECHANISM FOR PLANTERS
Harold V. Hansen, Moline, Ill., assignor to Deere &
Company, Moline, Ill., a corporation of Delaware
Filed July 24, 1959, Ser. No. 829,257
4 Claims. (Cl. 74—13)

The present invention relates generally to agricultural implements and, specifically, is principally concerned with a new and improved drive means for the seed dispensing mechanism of a multi-row planter.

The object and general nature of this invention is the provision of new and improved ratchet mechanism connected between the ends of the countershaft of the planter and the two planter ground wheels which drive the countershaft, the construction being such that right and left hand parts are not required; instead, parts such as the sprockets are each formed with two sets of ratchet teeth, each facing in the same direction but disposed at opposite sides of the plane of the sprocket teeth, whereby either sprocket may be disposed at either end of the shaft. Hence, the expense and trouble involved in providing two sets of sprockets, one right hand and the other left hand, are avoided, and also the expense and additional care involved not only in securing the proper assembling of right and left hand parts, but also the expense and care required in supplying and warehousing of two separate sets of parts, are avoided.

These and other objects and advantages of this invention will be apparent to those skilled in the art after a consideration of the following detailed description, taken in conjunction with the accompanying drawings, in which:

FIG. 1 is a fragmentary top plan view of a six row planter in which the principles of the present invention have been incorporated.

FIG. 2 is an enlarged fragmentary perspective view looking generally from front to rear and showing the ratchet drive mechanism that is incorporated in the planter shown in FIG. 1.

FIG. 3 is an enlarged plan view, with certain parts shown in section, of the left hand ratchet drive.

FIG. 4 is a view similar to FIG. 3, showing the right hand drive.

FIG. 5 is a sectional view taken along the line 5—5 of FIG. 3.

Figure 6:
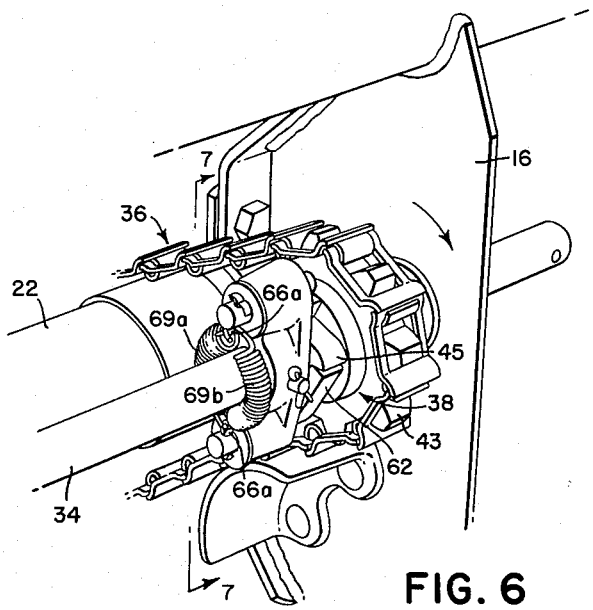
FIG. 6 is a view, similar to FIG. 2, showing an optional arrangement of the ratchet mechanism of this invention, looking toward the right end of the planter from a point laterally inwardly thereof.

Referring first to FIG. 1, the planter is indicated in its entirety by the reference numeral 10 and includes a frame 11 made up of an upper sill bar, preferably in the form of a transverse pipe member 12, a forward pipe member 13, the ends of which are bent rearwardly, as indicated at 14 in FIG. 1, and a lower sill member (not shown) that is connected to the upper pipe member 12 by vertical plate members 16 (FIG. 2), and similar vertical end sections 17 that are connected at their upper portions with the upper sill pipe 12 and at their lower ends to the lower sill member and the rear ends of the front frame bar sections 14. The planter 10 is adapted to be connected in trailing relation with a propelling tractor by hitch frame means 18. A wheel frame 21 is swingably connected in a suitable way with the main frame 11, preferably to the central vertical plate sections 16, and comprises a transverse rockshaft 22 and two pairs of wheel arms 23 that are arranged with one pair of each end of the rockshaft 22, as best shown in FIG. 1. Ground wheels 24 are carried on axle means between the arms of each pair of arms 23 and serve to support the planter both in operation and during transport, the wheel frame 21 being rockable about the axis of the member 22 by any suitable means (not shown). The wheels 24 also serve as means for driving the several planter units, each of which is indicated by the reference numeral 27 in FIG. 1. The units are of generally conventional construction, each embodying, among other things, a fore and aft extending drive shaft enclosed within a tubular member 28 that is swingably connected at its forward end with the planter frame 11. The several drive shafts just mentioned are driven through bevel gear means 29 from a transverse shaft 31, that, in turn, is driven through a change speed unit 32, and the latter is actuated by a drive chain 33 driven from a through shaft or jackshaft 34 supported by the associated planter frame plate members 16. As will be seen from FIG. 1, the shaft 34 extends substantially from one end to the other of the planter frame, and each end of the shaft 34 is connected with the adjacent ground wheel 24 by drive means 35 with which the present invention is particularly concerned.

The driving units 35 are substantially identical and hence a description of one of them will suffice for a full and complete disclosure. FIG. 2 shows the ratchet drive means at the left end of the planter shown in FIG. 1. Each planter wheel 24 carries a driving sprocket (not shown) over which a drive chain 36 is trained. Each chain 36 extends upwardly and forwardly, passing on opposite sides of the rockshaft 22, and at its upward end forward portion is trained over a sprocket 38 that is mounted for rotation on the adjacent end portion of the shaft 34. The planter of this invention is adapted to be set up for different row spacings, and when the planter is adapted, for example, to accommodate 30 to 40 inch row spacings, each sprocket 38 is mounted on the shaft 34 at the laterally outer side of the associated planter frame plate member 16, it being understood that according to practice that is conventional so far as this invention is concerned, the several planting units 27 may be disposed in several positions of lateral adjustment on the frame 11 to provide for the row spacing selected.

Each sprocket 38 is loosely mounted on the associated shaft 34 and each sprocket 38 is provided with two hub sections 41 and 42 (FIGS. 3 and 4) that are disposed at opposite sides of the plane of the toothed section of the sprocket gear 43. Each hub section is provided with ratchet teeth, best shown at 45 in FIG. 5, and each tooth has a driving face 46 that is generally perpendicular to the direction to the rotation of the sprocket 38. The direction of rotation is indicated by the arrow in the upper portion of FIG. 5. It will be seen from FIGS. 3 and 4 that the hub sections 41 and 42 have the driving faces 46 facing the same generally circumferentially direction and it will also be seen from FIGS. 3 and 4 that the two sprocket members 38, one at the left hand portion of the machine and the other at the right hand portion, are identical although, in the arrangement shown in FIGS. 3 and 4, pawl and ratchet mechanism 50, described below in detail, operates against teeth in the hub section 41 at the left end of the shaft 34 (FIG. 3) and similar pawl and ratchet mechanism 50a acts against the ratchet teeth on the other hub portion 42 at the right ends of the shaft 34. It will thus be observed that there are no rights and lefts in either the sprockets 38 or the pawl mechanisms 50 and 50a and that the parts shown in FIG. 3 are identical with those shown in FIG. 4. Hence, in assembling the planter no attention need be paid by the assemblers as to whether for example one sprocket or the other is chosen for either side of the machine. By virtue of this arrangement, the costs of assembly are reduced, as compared with situations where the assemblies are required to place right hand parts on the right hand portion of a machine and left hand parts on the left hand portion of the machine. Further, the cost of identical parts is less than the cost of parts where rights and lefts have to be provided. Costs are further reduced by the fact that records, storage space, and the like are reduced, both at the factory level and at the branch house and retail dealer level as well, where rights and lefts are avoided. This is an important advantage of the present invention.

The pawl and ratchet mechanism 50 and 50a will now be described. Secured to each end of the shaft 34 is a double armed pawl carrier 51 that includes a central hub section 52 removably secured, as by cross pin and cotter key means 53, to the associated end of the shaft 34. The right end of the shaft 34 is indicated at 54 (FIG. 4) and the left end is indicated at 55 (FIGS. 2 and 3), each end terminating a small distance inside the outer face of the associated pawl carrier member 51. Each member 51 carries two arm sections 57 and 58, and each section is provided with a transverse opening 59 in which the axially extending journal portion 61 of a pawl member 62 is disposed for rocking movement. Each pawl member 62 includes a detent end 63 that is adapted to engage the associated ratchet face 46, as will be clear from FIG. 5. The journaled portion 61 of each pawl member 62 extends laterally outwardly beyond the associated pawl carrier arm and is provided with a transverse opening in which a cotter 66 is disposed. As will be clear from FIG. 2, each cotter 66 includes an eye portion 66a and the ends 66b of the cotter are adapted to be bent over and partially around the associated journaled pawl portion 61 for the purpose of holding the cotter in place. The cotter also serves as means holding the associated pawl 62 in place in the pawl carrier 51. Further, it will be noted that the cotters 66 are parts that serve as extensions or arms disposed transversely with respect to the journaled portion 61 of each pawl member. The journaled portions 61 are apertured so that the extensions or arms 66 lie generally parallel with respect to the associated pawl detent section 63. When the sprockets 38 and associated parts lie outside the adjacent planter frame plate member 16, as shown in FIGS. 1 and 2, the axially outer end portions of the journaled sections 61 extend beyond the end of the shaft 34, as well be seen from FIG. 2. This makes it possible to apply a single tension spring member 69 in the manner illustrated in FIG. 2, connecting one end of this spring to one cotter and the other end of the spring to the other cotter, whereby the spring acts to swing the ends of both pawl detent sections 63 toward the ratchet teeth on the adjacent hub portion, the portion shown at 42, in FIGS. 2 and 4.

By virtue of the ratchet driving means described above, it will be seen that the shaft 34 is driven from both ground wheels 24 so long as the outfit is travelling forwardly in a straight line. If, however, some of the planter units should encounter very hard ground, one end of the planter may actually be raised until the ground wheel at that end of the planter is off the ground. However, the other ground wheel will still continue to drive the planting units until the hard spot is passed. Thus no loss in planting accuracy occurs.

Figure 7:
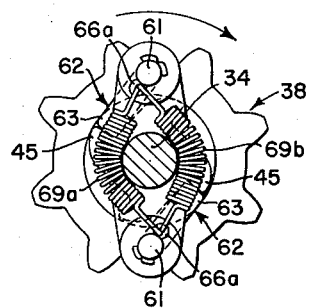
FIG. 7 is a view taken generally along the line 7—7 of FIG. 6.

Reference was made above to the fact that the planter units 27 are adjustable along the frame for different row spacings and where the spacings desired is relatively small, such as a twenty-eight inch spacing, a slightly different arrangement of the wheel frame is usually necessary, such as placing the ratchet mechanisms at the laterally inner side of the associated frame plate 16, rather than at the outer side as shown in FIG. 2. Where the ratchet mechanism is at the outside of the associated plane frame 16, then the single spring 69 can pass by the end of the shaft 34. However, when the ratchet units are placed at the inner side of the plate 16, as shown in FIGS. 6 and 7, the spring means biasing the pawl ends 63 for movement toward the associated ratchet teeth are required to pass around the associated shaft 34. In this case, it is necessary to provide two springs 69, because when the springs are required to pass around the shaft 34 one end of each spring exerts a smaller effective force on the cotter section associated therewith than the force exerted on the other cotter by the other end of the spring. Thus, as shown in FIG. 7, where the spring 69a is shown as acting at its lower end on the lower cotter extension 66 with appreciable force so as to urge the associated pawl end 63 toward the ratchet, the other end of the spring 69a, due to the deflection of the spring as it passes around the shaft 34, exerts a force that is more or less in line with the pivot axis of the upper pawl section 61 and thus is less effective so far as tendency to cause the upper detent end 63 to be urged toward the associated ratchet teeth is concerned. However, the second spring, indicated at 69b in FIG. 7, is connected so as to exert its force principally against the upper cotter extension 66 while the force exerted by the other end of the spring 69a is less effective on the lower cotter extension 66.

While I have shown and described above the preferred structure in which the principles of the present invention have been incorporated, it is to be understood that my invention is not to be limited to the particular details, shown and described above, but that, in fact, widely different means may be employed in the practice in the broader aspects of my invention.

What I claim, therefore, and desire to secure by Letters Patent is:

1. In an agricultural implement having a pair of laterally spaced apart drivers and an elongated shaft adapted to be driven from either or both of said drivers, the improvement comprising means to connect said pair of drivers to the ends of said shaft comprising a pair of sprockets rotatably mounted on the end portions of the shaft, chain means connecting each driver to the associated sprocket, each sprocket including a toothed portion and hub portions at opposite sides of said toothed portion, both hub portions of each sprocket having ratchet teeth facing in the same direction circumferentially of the hub, cooperating pawl means carried by the end portions of said shaft in positions to engage the ratchet teeth on one side of each of the associated hub portions, respectively, said sprockets being identical, one with respect to the other, whereby either sprocket may be mounted on either end of said shaft.

2. In an agricultural implement having a pair of laterally spaced apart drivers and an elongated shaft adapted to be driven from both of said drivers, means to connect said drivers to the ends, respectively, of said shaft, comprising a pair of identical driven members rotatably mounted on the end portions of the shaft, each of said driven members including an intermediate portion and hub portions at opposite sides of said intermediate portion, both hub portions of each of said driven members having ratchet teeth facing in the same direction circumferentially of the hub, cooperating pawl means carried by and rotatable with the end portions of said shaft and in positions to engage the ratchet teeth on one side of each of the associated hub portions, respectively, and driving means connecting the intermediate portions of said driven members with said drivers, respectively, said pawl means being located on said shaft laterally outwardly of the associated driven members, and means releasably mounting said pawl means on said shaft, the release of the pawl mounting means providing for removal of the associated driven member.

3. In an agricultural implement, drive means including a shaft, a sprocket rotatable about the axis of said shaft and mounted adjacent one end of the shaft, said sprocket having a hub formed with ratchet teeth, a pawl carrier fixed to the end of said shaft axially outward of but adjacent said sprocket and having arm sections disposed on the diametrically opposite ends of the carrier, pawls pivoted on said arm sections at the side thereof adjacent said sprocket and having portions swingable into engagement with said ratchet teeth, a laterally directed part carried by each of said pawls at the outer side of the associated arm section and disposed outwardly beyond the end of said shaft, and a pawl-biasing spring connected at its ends, respectively, to the outer portions of said parts for swinging both of said pawls into engagement with said ratchet teeth.

4. In an agricultural implement, drive means including a shaft, a sprocket rotatable about the axis of said shaft and spaced inwardly from the adjacent end of the shaft, said sprocket having a hub formed with ratchet teeth, a pawl carrier fixed to the end of said shaft axially inward of but adjacent said sprocket and having arm sections disposed on the diametrically opposite ends of the carrier, pawls pivoted on said arm sections at the side thereof adjacent said sprocket and having portions swingable into engagement with said ratchet teeth, a laterally directed part carried by each of said pawls at the laterally inner side of the associated arm section, and a pair of pawl-biasing springs passing across said shaft at opposite sides thereof and connected at their ends, respectively, to the outer portions of said parts for swinging both of said pawls into engagement with said ratchet teeth.

References Cited in the file of this patent

UNITED STATES PATENTS

| | | |
|---|---|---|
| 790,630 | Graham | May 23, 1905 |
| 1,480,351 | Sang | Jan. 8, 1924 |
| 1,645,269 | Wilson | Oct. 11, 1927 |
| 2,508,195 | Seaman et al. | May 16, 1950 |
| 2,525,435 | White | Oct. 10, 1950 |